Figure 1:
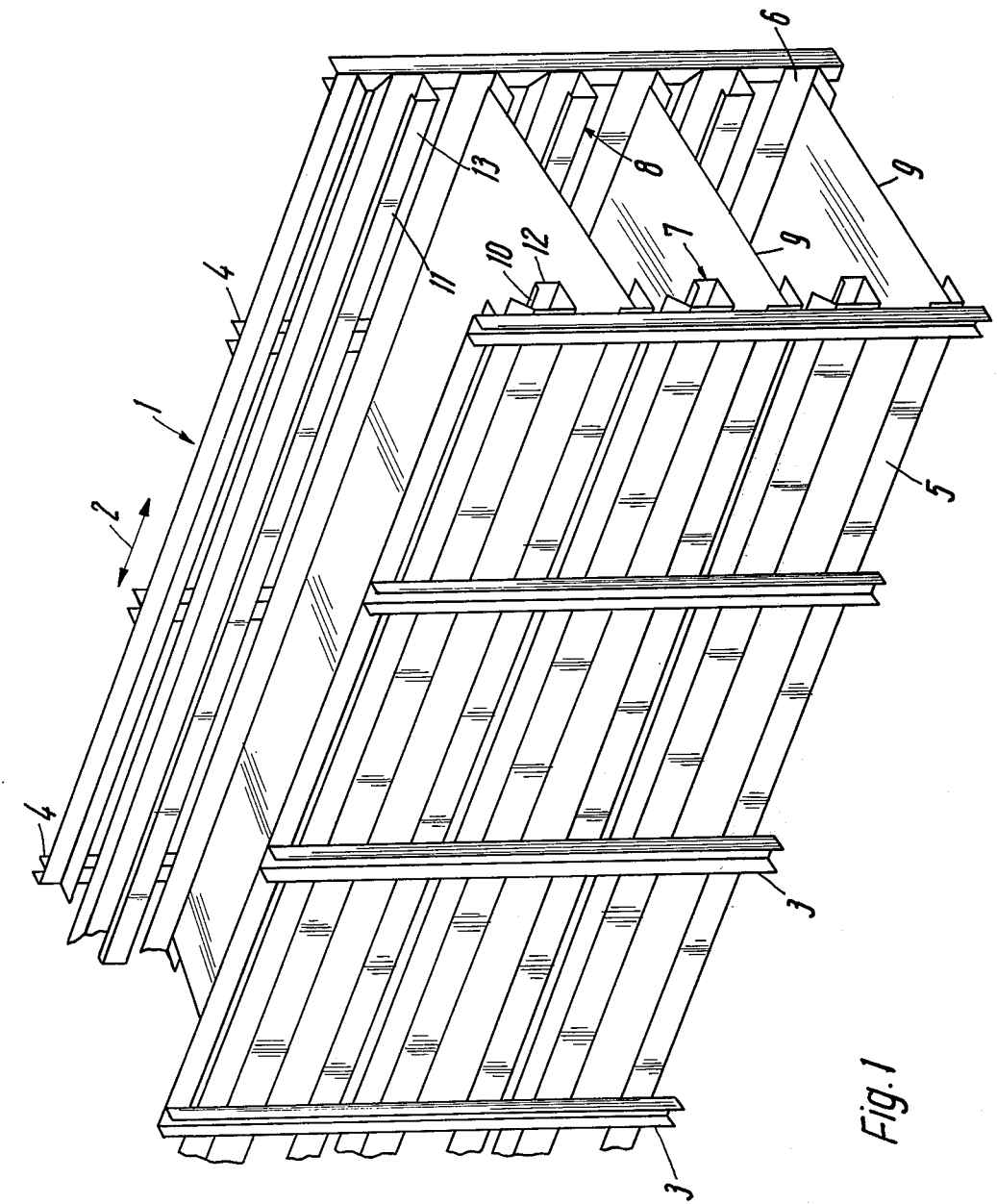

United States Patent [19]
Groppel

[11] 3,948,219
[45] Apr. 6, 1976

[54] BATTERY FARMING EQUIPMENT
[75] Inventor: Wilhelm Groppel, Melle, Germany
[73] Assignee: Wigro KG. Wilhelm Groppel, Melle, Germany
[22] Filed: Apr. 25, 1974
[21] Appl. No.: 463,983

[30] Foreign Application Priority Data
May 5, 1973 Germany............................ 2322811

[52] U.S. Cl.................................. 119/17; 119/18
[51] Int. Cl.².......................................... A01K 31/00
[58] Field of Search........................ 119/22, 17, 18

[56] References Cited
UNITED STATES PATENTS
553,902   2/1896   Dickey.................................. 119/17
2,061,712   11/1936   Martin.............................. 119/18 X
3,465,722   9/1969   Duff..................................... 119/18

*Primary Examiner*—Hugh R. Chamblee

[57] ABSTRACT

Battery farming equipment suitable for breeding, rearing or fattening purposes has a multi-tiered structure comprising movable perforated flooring for the livestock, and separate plates beneath the flooring for collecting excrement. The flooring extends wholly across the equipment to allow adequate space expansion for the growing livestock and is movable to facilitate a through-flow farming process.

9 Claims, 2 Drawing Figures

BATTERY FARMING EQUIPMENT

The present invention relates to battery farming equipment suitable for use in breeding or rearing and fattening livestock such as chickens.

When fattening broiler chickens by the predominant method in use, chicks are placed on the floor of heated stalls and supplied with feed and water. The creatures live on the floor, on a bedding of wood shavings, chaff and leaf mould with which the creatures' droppings mingle, the bedding absorbing moisture therefrom, until the creatures have reached their final weight. While they are growing, the creatures are tended either by hand or by means of suitable mechanical delivery devices. When the desired growth is reached, the creatures are caught by hand and transported in containers to the slaughter-house. The used bedding is then removed, the bedding being unchanged throughout the fattening process. After the application of fresh bedding, the floor of the stall can then be re-used for another fattening process. The population density can amount to around 15 to 20 creatures per m². The creatures do not require the entire stall floor area at the beginning of a fattening period because of their small size, so that the stall space actually required is often partitioned off, for example by curtains. The floor area made available to the animals is increased as fattening progresses. The stalls are heated only in the area occupied by animals.

This fattening process has various disadvantages which include considerable expenditure of work which is basically necessitated inter alia by the application of bedding, regular re-bedding, tending the creatures and capturing them. The high construction costs of space-consuming stalls result in high fattening costs when the relatively low degree of space utilisation is taken into account. Moreover, the direct contact between the creatures and their droppings promotes disease.

Recently, trials have been conducted to rear broilers in fattening batteries. Such fattening batteries, whose construction corresponds to known laying and breeding batteries in which the creatures are kept in individual boxes, exclude direct contact of the creatures with their droppings. The droppings are allowed to fall down through perforated floors of the boxes onto continuously cleared droppings plates and the trials have indicated that exploitation is made possible, within several days, of a threefold rise in utilisation of the area of the stall floor.

The construction of such batteries involves high construction costs and the accommodation of creatures in groups in individual boxes necessitates time-consuming operations to introduce the animals into the stalls and to remove them. Particularly in the removal of the creatures by hand, a considerable number of injuries can occur resulting in a lowering of quality. A big disadvantage of such batteries is the need to heat the whole stall space of the battery for the entire fattening period. The resulting operating cost is admittedly reduced if the animals are initially restricted to only one part of the battery and if they change stalls after reaching a certain size. However, the resulting cost of changing stalls, with the attendant risk of injuring the creatures, generally absorbs savings in heating costs.

The principal aim of the present invention is to minimise the disadvantages attending earlier approaches to battery farming, and accordingly the present invention provides battery farming equipment including a frame bearing a perforated floor for accommodating livestock, the floor occupying substantially the entire width and length of the frame and being free of divisions or partitions, and the floor being disposed horizontally spaced above a droppings plate. Preferably, the frame accommodates several tiers stacked one above another, each tier containing a floor with a corresponding droppings plate.

A preferred embodiment enables broiler fattening to be achieved with favourable running costs and without high capital expenditure. The chicks are put in the different tiers of the battery at one end at the beginning of a fattening period and gradually spread out over the entire length of the battery as they grow larger. The equipment prevents the animals from having direct contact with their droppings and allows them to be supplied with feed and water particularly simply, and when they are ready, to be removed quickly and simply. If desired sections of the battery could be partitioned by means of curtains to allow progressive increase of the area available to occupation, and this facility enables heating costs to be kept down.

It is preferred that the or each floor presents a base movable longitudinally in the frame. The or each floor can consist of a number of independent floor sections or panels which can be supported directly adjacent one another on continuous longitudinal members of the frame. Preferably, each floor section can be moved along runners and supporting rollers longitudinally of the frame. Feed channels are desirably provided as part of the frame, the channels basically being in the form of a "U" open at the top. The feed channels in a preferred embodiment are designed to support the flooring. Such a design enables chicks to be put into the battery by sliding floor sections occupied by them onto one end of the frame and in the same way enables the fattened creatures to be removed, at which point the floor sections occupied by them are taken off the end of the frame one after the other and the animals transferred into transportation boxes. This either substantially eliminates or reduces to a minimum the risk of injuring the creatures.

Battery or factory farming employing the present invention is facilitated, costs can be kept to an economic level and the risk of damaging or losing livestock is thereby minimised. The farming process involves introducing the livestock into one end of the equipment, fattening them by automatic feeding techniques while keeping them substantially out of direct contact with their excreta throughout the fattening period, and thereafter unloading them from the other end of the equipment upon the flooring which has supported them throughout this period. In effect, a through-flow process is involved. The present invention embraces such a battery or factory farming technique.

Figure 2:
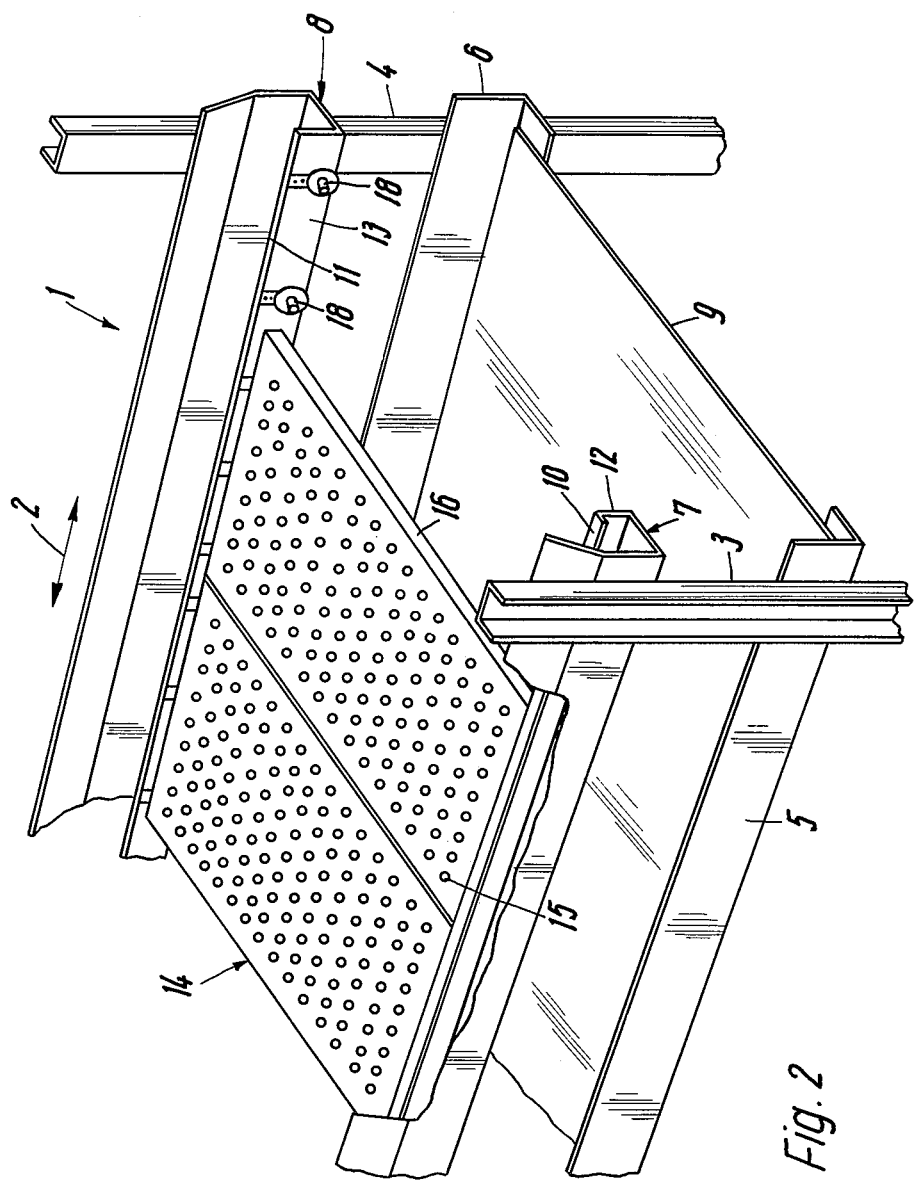

The invention will now be described in more detail by way of example only with reference to the accompanying drawings, in which:

FIG. 1: a partial perspective representation of one end of a broiler-fattening battery embodying the invention, and FIG. 2: an enlarged fragmentary representation illustrating details of the battery shown in FIG. 1.

The battery represented in the drawings comprises a frame 1 whose dimensions in the longitudinal direction shown by the arrow 2 can be chosen arbitrarily. The frame 1 has vertical uprights 3, 4 arranged at intervals along the length of the frame on either longitudinal side thereof and horizontal struts 5, 6 and 7, 8 running continuously along the length of the frame. The struts 5, 6, 7 and 8 are fastened, so as to turn towards one another, on the inside surfaces of the uprights 3, 4. The members 3, 5 and 7 form one long side wall of the frame 1 and the members 4, 6 and 8 the opposite long side wall. Horizontal transverse struts provided on the bottom and/or on the top of the frame 1 are not illustrated in detail but can be used to brace the frame 1.

The longitudinally extending struts 5, 6 are here shown as angle irons whose horizontal sides serve as ledges on which droppings plates 9 are supported. The dropping plates 9 can, for example, be of cementitious asbestos sheets fixed in the frame. The struts 7, 8 in the example shown are in profile channels which have the cross-sectional form of a U open at the top and are used as feed channels, and also to support flooring panels above associated droppings plates 9. The struts 7, 8 have inner sides or walls 12, 13 provided with edges 10 and 11 flanged or turned inwards with respect to the U, runners and free-running supporting rollers 18 fitted at intervals along their lengths. As will be seen, each U-shaped strut 7, 8 has a long limb attached at intervals to uprights 3, 4. The long limb has an upper portion which is inclined upwardly and inwardly with respect to the frame 1. The upper portions of selected struts 7 serve as the floor runners, and as may be seen in the drawings, the floor 14 can be grooved to co-operate with the runners. The rollers 18 are borne on the inwardly-facing sides of the short limbs of selected struts 8. These form a common supporting plane for a floor 14 positioned horizontally above a corresponding droppings plate 9, and like the latter occupies the entire width and length of the frame 1. Each floor 14 offers a base support for the broilers free of any transverse sub-divisions. Perforations 15 in the floor 14 enable droppings to fall down onto the dropping plate 9 underneath.

In the preferred form of construction illustrated, each floor 14 consists of a multiplicity of floor sections or panels 16 arranged directly adjacent one another in the longitudinal direction 2 and to form in combination the surface of the floor. Each floor section 16 is supported at its opposite ends on the runners and supporting rollers 18 and can be moved on these in the longitudinal direction. A winch, for example, can be used to move the floor.

As shown in FIG. 1, the frame 1 has three tiers which each have a floor 14 with a corresponding droppings plate 9, the floors and droppings plates being stacked one above another. It is to be understood, however, that a frame can be equipped with only one, or two, four or more tiers. It will be realised that FIG. 1 is not complete as to the floors 14, in the interests of clarity of illustration.

At the beginning of a fattening period, chicks are put in at the end of the frame 1 not shown in FIG. 1 of the drawing on the floors 14 of all the tiers. As the fattening period progresses, the growing broilers finally take up the entire area of the floors 14, the expansion not being prevented by any kind of fixed partition. At the end of a fattening period, the broilers are taken out by moving the floor sections 16 of a floor 14 all together in the direction from the said one end of the frame to the other end of the frame. The floor section 16 occupied with broilers is taken off the frame and, after removing the creatures and packing them in transportation containers, the emptied sections 16 can be pushed onto the other end of the frame again. Alternatively, the removed floor section can also be pushed onto the same end of the frame, at another tier or level in the stack, if such a tier is empty at that stage. Emptying the frame 1 in this way can be carried out quickly and without risking injuring to the fattened creatures.

The illustrated battery construction is particularly simple, sturdy and long-lasting. In a modification, it is also possible to provide another floor which presents a longitudinally movable base.

The vertical distance between the plane of a floor 14 and its associated droppings plate 9 is preferably calculated so that the entire droppings of a fattening period can be accommodated on the droppings plate. This makes it possible to remove droppings only after the creatures have been taken out, and the dry, innocuous droppings can be evacuated more easily than is the case with continuous removal or droppings. Also, the odour nuisance is reduced.

Although the foregoing description relates to broiler fattening, this does not preclude application of the invention to the breeding or rearing of laying hens.

I claim:

1. A life stock fattening battery comprising an elongated frame, an elongated perforated floor means extending longitudinally between an input end and an output end of the frame and having an unobstructed width substantially coextensive with the width of the frame, the floor being divided longitudinally into a plurality of substantially rigid sections in open communication and abutted with each other, a droppings plate supported on the frame parallel to and beneath the floor means, means attached with said frame for slidably and horizontally supporting said floor sections for longitudinal movement within the frame, and means defined by end portions of said frame and providing open access to the floor at each end of the frame for loading livestock and the floor sections at the input end of the frame and for unloading livestock and the floor sections at the output end of the frame.

2. A battery according to claim 1, wherein said frame has uprights and horizontal members attached thereto to form two spaced-apart sides, said horizontal members comprising at least one pair of angle-irons for supporting at least one droppings plate, and at least one pair of channel members to support the floor and to serve as feed troughs.

3. A battery according to claim 2, wherein said channel members are of generally U-shaped cross-section, each having a long limb attached at intervals to said uprights, and said long limb having an upper portion inclined upwardly and inwardly with respect to said frame.

4. A battery according to claim 3, wherein said inclined portion of a selected channel member defines a floor runner allowing the associated floor to move lengthwise of said frame.

5. A battery according to claim 4, wherein each U-shaped channel member has a short limb and inwardly-facing floor-bearing rollers are mounted on the short limbs of selected channel members.

6. A battery as defined in claim 1, in which a plurality of the floors are supported for longitudinal movement one above the other in the frame, and in which a plurality of the droppings plates are individually associated with and supported between successive ones of the floors.

7. A battery as defined in claim 1, in which the sections are separable floor panels disposed in contact with each other to define life stock-supporting supporting platforms, and the access providing means includes means for selectively inserting and removing at least one of the floor panels at each end of the frame.

8. A battery as defined in claim 1, further comprising a plurality of upwardly opening channel members affixed to the frame adjacent the floor to provide feed troughs for the life stock supported on the floor.

9. A battery as defined in claim 1, in which the longitudinal supporting means comprises cooperating rollers and runners individually associated with the floor and with an inner wall of each channel member.

* * * * *